United States Patent
Mears et al.

(10) Patent No.: US 8,887,291 B1
(45) Date of Patent: Nov. 11, 2014

(54) SYSTEMS AND METHODS FOR DATA LOSS PREVENTION FOR TEXT FIELDS

(71) Applicant: Symantec Corporation, Mountain View, CA (US)

(72) Inventors: John Mears, Oxfordshire (GB); Ben Scholl, Gloucestershire (GB)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 13/782,136

(22) Filed: Mar. 1, 2013

(51) Int. Cl.
*G06F 7/04* (2006.01)
*G06F 21/60* (2013.01)

(52) U.S. Cl.
CPC ................................. *G06F 21/60* (2013.01)
USPC ........................................ 726/26; 713/182

(58) Field of Classification Search
CPC .............. G06F 21/10; G11B 20/00086; G11B 20/0021; H04L 63/0428; H04N 21/4405
USPC .................... 726/24–28, 1, 32, 33, 164, 182; 713/182, 188; 706/12
See application file for complete search history.

(56) References Cited

U.S. PATENT DOCUMENTS

| | | | | |
|---|---|---|---|---|
| 5,442,707 | A * | 8/1995 | Miyaji et al. | 380/30 |
| 5,864,853 | A * | 1/1999 | Kimura et al. | 1/1 |
| 6,272,641 | B1 * | 8/2001 | Ji | 726/24 |
| 7,343,626 | B1 * | 3/2008 | Gallagher | 726/25 |
| 7,398,553 | B1 * | 7/2008 | Li | 726/22 |
| 7,953,293 | B2 * | 5/2011 | Doswald | 382/276 |
| 7,991,747 | B1 * | 8/2011 | Upadhyay et al. | 707/674 |
| 7,996,373 | B1 * | 8/2011 | Zoppas et al. | 707/694 |
| 8,011,003 | B2 * | 8/2011 | Rowney et al. | 726/13 |
| 8,090,800 | B2 * | 1/2012 | Yee | 709/219 |
| 8,108,935 | B1 * | 1/2012 | Sobel et al. | 726/26 |
| 8,255,370 | B1 * | 8/2012 | Zoppas et al. | 707/694 |
| 8,281,401 | B2 * | 10/2012 | Pennington et al. | 726/25 |
| 8,312,553 | B2 * | 11/2012 | Rowney et al. | 726/26 |
| 8,321,560 | B1 * | 11/2012 | Pai et al. | 709/224 |
| 8,356,357 | B1 * | 1/2013 | Barile et al. | 726/26 |
| 8,429,745 | B1 * | 4/2013 | Casaburi et al. | 726/22 |
| 8,495,705 | B1 * | 7/2013 | Verma et al. | 726/2 |
| 8,516,597 | B1 * | 8/2013 | Sharma et al. | 726/25 |
| 8,612,594 | B1 * | 12/2013 | Pai et al. | 709/225 |
| 8,671,080 | B1 * | 3/2014 | Upadhyay et al. | 707/674 |
| 8,682,100 | B2 * | 3/2014 | Doswald | 382/276 |
| 8,726,396 | B1 * | 5/2014 | Dodke | 726/26 |

(Continued)

OTHER PUBLICATIONS

John Mears; Systems and Methods for Data Loss Prevention; U.S. Appl. No. 13/372,118; filed Feb. 13, 2012.

*Primary Examiner* — Abu Sholeman
(74) *Attorney, Agent, or Firm* — ALG Intellectual Property, LLC

(57) ABSTRACT

A computer-implemented method for data loss prevention for text fields may include (1) identifying a form submission sent from a client system, the form submission including a textual field, (2) storing at least one characteristic of a value of the textual field within the form submission in connection with an identifier of a form used to generate the form submission, (3) determining, based at least in part on the characteristic of the value of the textual field, that the textual field may include user-generated content, (4) intercepting a subsequent form submission derived from the form, (5) subjecting the textual field within the subsequent form submission to a data-loss-prevention analysis based at least in part on determining that the textual field may include user-generated content and (6) performing a data-loss-prevention action based on the data-loss-prevention analysis.

17 Claims, 6 Drawing Sheets

(56) References Cited

U.S. PATENT DOCUMENTS

| | | | |
|---|---|---|---|
| 8,726,405 B1* | 5/2014 | Bailey et al. | 726/29 |
| 8,751,568 B1* | 6/2014 | Mears | 709/203 |
| 8,752,180 B2* | 6/2014 | Barile et al. | 726/25 |
| 2005/0203844 A1* | 9/2005 | Ferguson et al. | 705/40 |
| 2009/0287654 A1* | 11/2009 | Sato et al. | 707/3 |
| 2009/0300770 A1* | 12/2009 | Rowney et al. | 726/26 |
| 2011/0055209 A1* | 3/2011 | Novac et al. | 707/737 |
| 2011/0093449 A1* | 4/2011 | Belenzon et al. | 707/708 |
| 2011/0154473 A1* | 6/2011 | Anderson et al. | 726/11 |
| 2011/0185271 A1* | 7/2011 | Aciicmez et al. | 715/234 |
| 2011/0211074 A1* | 9/2011 | Doswald | 348/180 |
| 2011/0252475 A1* | 10/2011 | Mui et al. | 726/23 |
| 2011/0276539 A1* | 11/2011 | Thiam | 707/634 |
| 2012/0005753 A1* | 1/2012 | Provos et al. | 726/23 |
| 2012/0106366 A1* | 5/2012 | Gauvin | 370/252 |
| 2012/0131012 A1* | 5/2012 | Taylor et al. | 707/748 |
| 2012/0210437 A1* | 8/2012 | Karande et al. | 726/26 |
| 2012/0246303 A1* | 9/2012 | Petersen et al. | 709/224 |
| 2012/0290940 A1* | 11/2012 | Quine | 715/744 |
| 2012/0290955 A1* | 11/2012 | Quine | 715/763 |
| 2012/0290959 A1* | 11/2012 | Quine | 715/765 |
| 2012/0291005 A1* | 11/2012 | Quine | 717/105 |
| 2012/0291006 A1* | 11/2012 | Quine | 717/105 |
| 2012/0291011 A1* | 11/2012 | Quine | 717/115 |
| 2012/0303558 A1* | 11/2012 | Jaiswal | 706/12 |
| 2013/0024942 A1* | 1/2013 | Wiegenstein et al. | 726/25 |
| 2013/0055403 A1* | 2/2013 | Pennington et al. | 726/25 |
| 2013/0097662 A1* | 4/2013 | Pearcy et al. | 726/1 |
| 2013/0117858 A1* | 5/2013 | Werner et al. | 726/27 |
| 2013/0174259 A1* | 7/2013 | Pearcy et al. | 726/25 |
| 2013/0241952 A1* | 9/2013 | Richman et al. | 345/619 |
| 2013/0247204 A1* | 9/2013 | Schrecker et al. | 726/25 |
| 2013/0268290 A1* | 10/2013 | Jackson et al. | 705/2 |
| 2013/0339250 A1* | 12/2013 | Katzin et al. | 705/44 |
| 2013/0347094 A1* | 12/2013 | Bettini et al. | 726/11 |

\* cited by examiner

SYSTEMS AND METHODS FOR DATA LOSS PREVENTION FOR TEXT FIELDS

BACKGROUND

In the information age, individuals and organizations may quickly and easily share, access, and disseminate high volumes of digital information. For many individuals and organizations, the ease with which information may be electronically disseminated is empowering. However, the ubiquity of high-speed Internet access via a variety of computing devices may pose unique challenges for individuals and organizations concerned with preventing the loss and/or exposure of sensitive data. Individuals and organizations are therefore increasingly looking to data loss prevention ("DLP") solutions to protect their sensitive data.

Traditional DLP systems may use proxies to intercept and scan outgoing data to prevent sensitive data from leaving local protected networks into the wider Internet. Unfortunately, the high volume of network traffic common in modern environments may place a significant strain on computing resources as traditional DLP systems scan all data that passes through proxies. Furthermore, DLP systems may scan irrelevant data and thereby increase the chances of false positives while wasting misdirected computing resources.

Accordingly, the instant disclosure identifies and addresses a need for additional and improved systems and methods for data loss prevention for text fields.

SUMMARY

As will be described in greater detail below, the instant disclosure generally relates to systems and methods for data loss prevention for text fields by gathering data on text fields within repeatedly observed forms, using one or more heuristics to analyze the data and determine whether the text fields likely represent user-generated content, and performing data loss prevention scans on only those text fields that likely represent user-generated content.

In one example, a computer-implemented method for data loss prevention for text fields may include (1) identifying a form submission sent from a client system, the form submission including a textual field, (2) storing at least one characteristic of a value of the textual field within the form submission in connection with an identifier of a form used to generate the form submission, (3) determining, based at least in part on the characteristic of the value of the textual field, that the textual field may include user-generated content, (4) intercepting a subsequent form submission derived from the form, (5) subjecting the textual field within the subsequent form submission to a data-loss-prevention analysis based at least in part on determining that the textual field may include user-generated content and (6) performing a data-loss-prevention action based on the data-loss-prevention analysis.

In one embodiment, the computer-implemented method may also include (1) storing an additional characteristic of an additional value of an additional textual field within the form submission on connection with the identifier of the form, (2) determining, based at least in part on the additional characteristic, that the additional textual field may not comprise user-generated content and (3) omitting the additional textual field from the data-loss-prevention analysis based at least in part on determining that the additional textual field may not comprise user-generated content.

In some examples, determining that the textual field may include user-generated content may be based at least in part on a plurality of characteristics of a plurality of values of the textual field collected from a plurality of form submissions.

In some examples, determining that the textual field may include user-generated content may be based at least in part on a statistical feature of the plurality of characteristics.

In one embodiment, the statistical feature may include (1) a number of distinct values within the plurality of values observed within the textual field and/or (2) a variance in textual length of the plurality of values observed within the textual field.

In one embodiment, the characteristic may include (1) a character distribution within the value of the textual field, (2) a textual length of the value of the textual field, and/or (3) a number of spaces within the value of the textual field.

In some examples, intercepting the subsequent form submission may include intercepting the subsequent form submission on an intermediate network device between a source of the subsequent form submission and a target of the subsequent form submission.

In some examples, storing the characteristic may include storing the characteristic in connection with an identifier of the textual field.

In one embodiment, a system for implementing the above-described method may include (1) an identification module programmed to identify a form submission sent from a client system and including a textual field, (2) a storing module programmed to store at least one characteristic of a value of the textual field within the form submission in connection with an identifier of a form used to generate the form submission, (3) a determination module programmed to determine, based at least in part on the characteristic of the value of the textual field, that the textual field includes user-generated content, (4) an interception module programmed to intercept a subsequent form submission derived from the form, (5) a subjection module programmed to subject the textual field within the subsequent form submission to a data-loss-prevention analysis based at least in part on determining that the textual field includes user-generated content, (6) a performing module programmed to perform a data-loss-prevention action based on the data-loss-prevention analysis and (7) at least one processor configured to execute the identification module, the storing module, the determination module, the interception module, the subjection module and the performing module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a form submission sent from a client system, the form submission including a textual field, (2) store at least one characteristic of a value of the textual field within the form submission in connection with an identifier of a form used to generate the form submission, (3) determine, based at least in part on the characteristic of the value of the textual field, that the textual field may include user-generated content, (4) intercept a subsequent form submission derived from the form, (5) subject the textual field within the subsequent form submission to a data-loss-prevention analysis based at least in part on determining that the textual field may include user-generated content and (6) perform a data-loss-prevention action based on the data-loss-prevention analysis.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
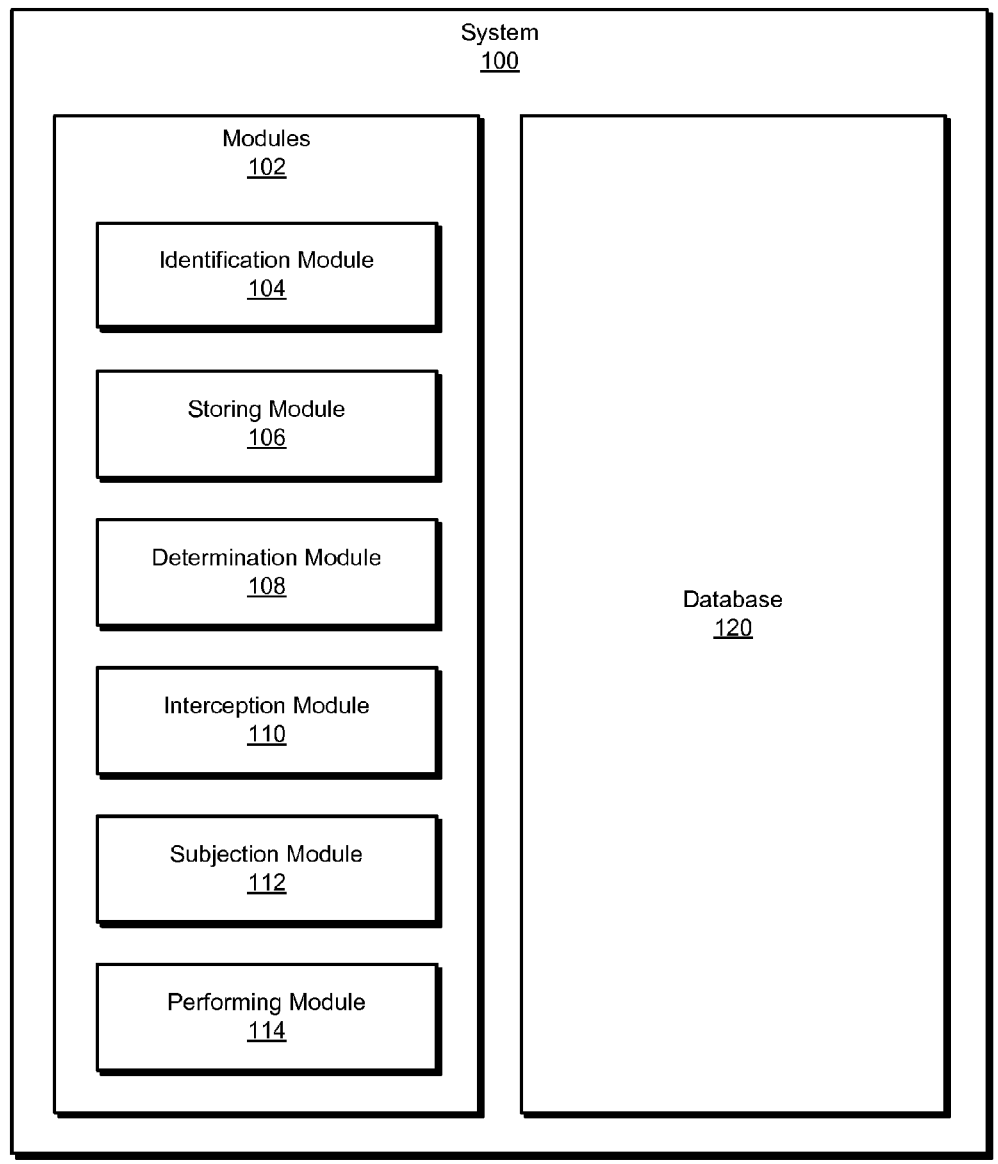
FIG. 1 is a block diagram of an exemplary system for data loss prevention for text fields.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for data loss prevention for text fields. As will be explained in greater detail below, by gathering data on text fields within repeatedly observed forms, using one or more heuristics to analyze the data and determine whether the text fields likely represent user-generated content, and performing data loss prevention scans on only those text fields that likely represent user-generated content, the systems and methods described herein may potentially consume fewer computing resource by scanning less data. Furthermore, by scanning only data in fields with user-generated content while skipping data in other fields, the systems and methods described herein may reduce the number of false positives generated by data-loss-prevention scans of form submissions (e.g., by scanning less data) while still scanning all relevant data (e.g., data supplied by a user). Accordingly, these systems and methods may improve the accuracy of data-loss-prevention scans.

Figure 2:
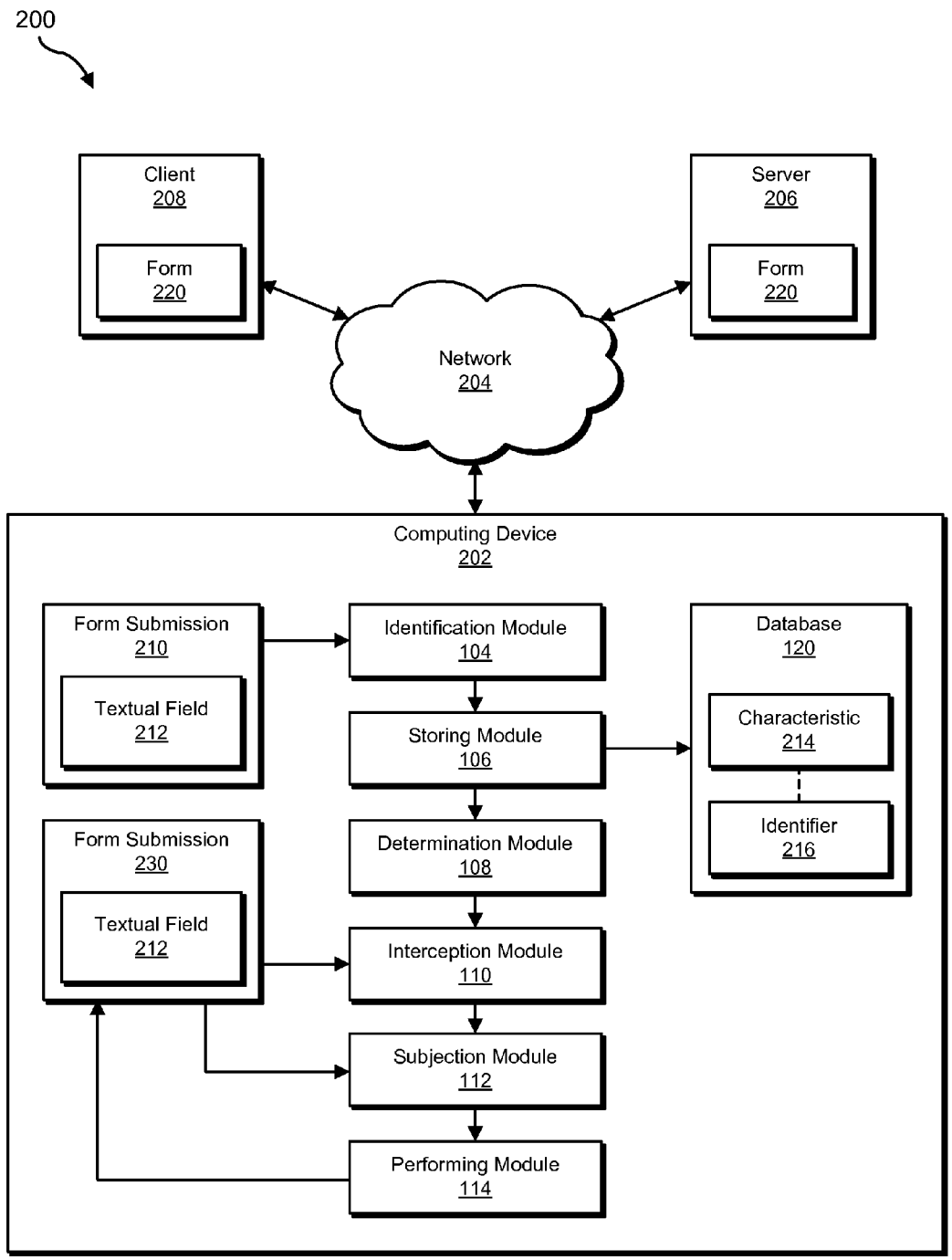
FIG. 2 is a block diagram of an exemplary system for data loss prevention for text fields.
Figure 3:
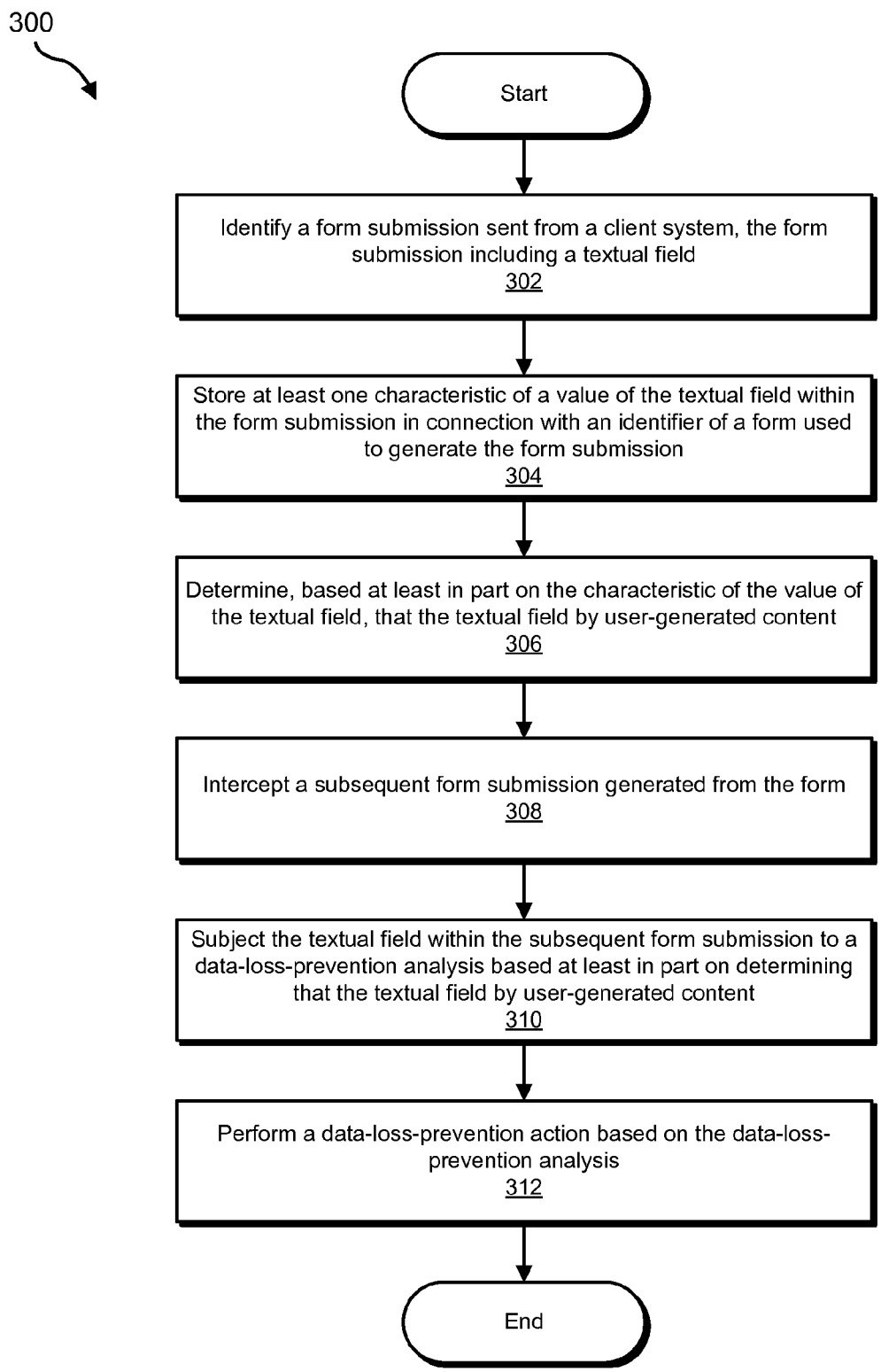
FIG. 3 is a flow diagram of an exemplary method for data loss prevention for text fields.
Figure 4:
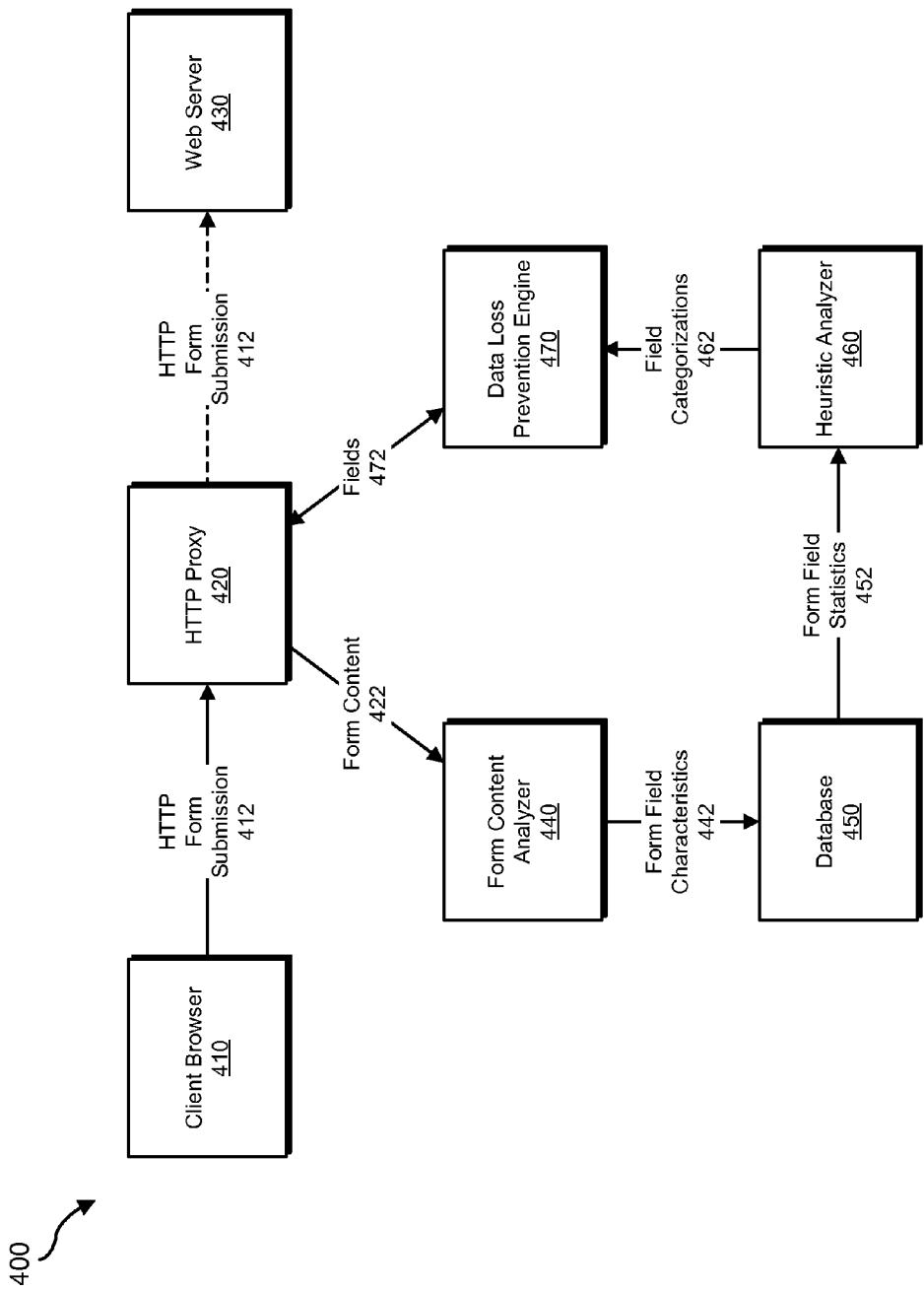
FIG. 4 is a block diagram of an exemplary system for data loss prevention for text fields.

The following will provide, with reference to FIGS. 1, 2, and 4, detailed descriptions of exemplary systems for data loss prevention for text fields. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of exemplary system 100 for data loss prevention for text fields. As illustrated in this figure, exemplary system 100 may include one or more modules 102 for performing one or more tasks. For example, and as will be explained in greater detail below, exemplary system 100 may also include an identification module 104 programmed to identify a form submission sent from a client system that includes a textual field. Exemplary system 100 may additionally include a storing module 106 programmed to store at least one characteristic of a value of the textual field within the form submission in connection with an identifier of a form used to generate the form submission. Exemplary system 100 may also include a determination module 108 programmed to determine, based at least in part on the characteristic of the value of the textual field, that the textual field includes user-generated content. Exemplary system 100 may additionally include an interception module 110 programmed to intercept a subsequent form submission derived from the form. Exemplary system 100 may also include a subjection module 112 programmed to subject the textual field within the subsequent form submission to a data-loss-prevention analysis based at least in part on determining that the textual field includes user-generated content. Exemplary system 100 may additionally include a performing module 114 programmed to perform a data-loss-prevention action based on the data-loss-prevention analysis. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or client 208), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store historical observations of and/or statistical data about textual field values.

Database 120 may represent portions of a single database or computing device or a plurality of databases or computing devices. For example, database 120 may represent a portion of computing device 202 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as computing device 202 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. Computing device 202 may be programmed with one or more of modules 102 and/or may store all or a portion of the data in database 120. Additionally or alternatively, client 208 may be programmed with one or more of modules 102 and/or may store all or a portion of the data in database 120.

In one embodiment, one or more of modules 102 from FIG. 1 may, when executed by at least one processor of computing device 202 and/or client 208, facilitate computing device 202 and/or client 208 in data loss prevention for text fields. For example, and as will be described in greater detail below, one or more of modules 102 may cause computing device 202 and/or client 208 to efficiently enforce data loss prevention policies on text fields within form submissions. For example, and as will be described in greater detail below, identification module 104 may be programmed to identify a form submission 210 sent from a client 208 and including a textual field 212. Storing module 106 may be programmed to store a characteristic 214 of the value of textual field 212 within form submission 210 in connection with an identifier 216 of a form 220 used to generate form submission 210. Determination module 108 may be programmed to determine, based at least in part on the characteristic of the value of textual field 212, that textual field 212 includes user-generated content. Interception module 110 may be programmed to intercept a subsequent form submission 230 also derived from form 220. Subjection module 112 may be programmed to subject textual field 212 within form submission 230 to a data-loss-prevention analysis based at least in part on determining that textual field 212 includes user-generated content. Performing module 114 may be programmed to perform a data-loss-prevention action (e.g., on form submission 230) based on the data-loss-prevention analysis.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 510 in FIG. 5, or any other suitable computing device.

Server 206 generally represents any type or form of computing device that is capable of receiving a form submission and/or providing a form to a client for submission. Examples of server 206 include, without limitation, application servers and database servers configured to provide various database services and/or run certain software applications.

Client 208 generally represents any type or form of computing device that is capable of submitting a form. Examples of client 208 include, without limitation, laptops, tablets, desktops, servers, cellular phones, Personal Digital Assistants (PDAs), multimedia players, embedded systems, combinations of one or more of the same, exemplary computing system 510 in FIG. 5, or any other suitable computing device.

Network 204 generally represents any medium or architecture capable of facilitating communication or data transfer. Examples of network 204 include, without limitation, an intranet, a Wide Area Network (WAN), a Local Area Network (LAN), a Storage Area Network (SAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between computing device 202 and server 206.

FIG. 3 is a flow diagram of an exemplary computer-implemented method 300 for data loss prevention for text fields. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a form submission sent from a client system, the form submission comprising a textual field. For example, at step 302 identification module 104 may, as part of computing device 202 in FIG. 2, identify form submission 210 sent from client 208 (e.g., and directed to server 206) and including textual field 212.

As used herein, the phrase "form submission" may refer to any request, message, and/or communication configured to transmit one or more fields of data to a server. For example, a form submission may include one or more fields of data specified in and/or submitted via a Hypertext Transfer Protocol ("HTTP") form (e.g., a POST request). In some examples, the phrase "POST request" may refer to an analogue, alternative, and/or successor to a Hypertext Transfer Protocol POST request. For example, the phrase "POST request" may refer to a communication of MIME type "multipart/form-data" (e.g., in a Hypertext Transfer Protocol communication). As another example, the phrase "form submission" may refer to data transmitted according to JavaScript Object Notation ("JSON") that includes one or more data fields.

As used herein, the phrase "client system" may refer to any system capable of submitting a form. In some examples, the phrase "client system" may refer to a personal computing system (e.g., a desktop, a mobile computing device, etc.). Additionally or alternatively, the phrase "client system" may refer to a client application (e.g., a web browser).

As used herein, the term "form" may refer to any Internet document, resource, and/or component thereof that includes one or more data fields. For example, the term "form" may refer to a web form (e.g., an HTML form). For example, a web form may include one or more textual fields (e.g., fields that include and/or are configured to carry textual data). In some examples, a field may be user-editable. For example, a web form may allow a user to change a value within a field (e.g., adding text to a text field). Alternatively, a field may be non-user-editable. In some examples, a field may be hidden (e.g., not visible to a user on a rendered web page containing the web form).

Identification module 104 may identify the form submission in any suitable context. For example, identification module 104 may identify the form submission by intercepting the form submission on a proxy system configured to perform data-loss-prevention for the client system (and, in some examples, additional client systems). In some examples, the proxy system may be configured to intercept network traffic from the client system. For example, the proxy system may be configured to intercept all network traffic from the client system, network traffic from the client system destined to an external network, network traffic from the client system leaving a protected network, network traffic from certain applications on the client system, etc. In some examples, the proxy system may operate independently from the client system (e.g., on a separate computing device).

FIG. 4 is a block diagram of an exemplary computing system 400. As shown in FIG. 4, computing system 400 may include a client browser 410, an HTTP proxy 420, a web server 430, a form content analyzer 440, a database 450, a heuristic analyzer 460, and a data loss prevention engine 470. Using FIG. 4 as an example, at step 302 identification module 104 may, as a part of HTTP proxy 420, identify an HTTP form submission 412 originating from client browser 410 and directed to web server 430 (e.g., from which client browser 410 may have retrieved the form used for the form submission).

Returning to FIG. 3, at step 304 one or more of the systems described herein may store at least one characteristic of a value of the textual field within the form submission in connection with an identifier of a form used to generate the form submission. For example, at step 304 storing module 106 may, as part of computing device 202 in FIG. 2, store characteristic 214 of the value of textual field 212 within form submission 210 in connection with an identifier 216 of form 220 used to generate form submission 210.

As used herein, the term "characteristic" as applied to textual fields and/or values of textual fields may refer to any characteristic, attribute, and/or property of a textual field and/or value of a textual field. For example, the characteristic may include a textual length of the value of the textual field (e.g., "30 characters" or "48 characters"). Additionally or alternatively, the characteristic may include a character distribution within the value of the textual fields (e.g., textual characters arranged to represent hexadecimal values). In some examples, the characteristic may include the number of spaces within the value of the textual field (e.g., "1001 Maple View Ave" having three spaces).

Storing module 106 may store any suitable identifier of the form in connection with the characteristic. For example, storing module 106 may store a URL of a web page that includes the form. In this example, by querying a database with the URL, one or more of the systems described herein may thereby retrieve the characteristic at a later time (e.g., along with characteristics of the textual field from other form submissions). In some examples, storing module 106 may store the characteristic in connection with an identifier of the textual field. For example, storing module 106 may store the characteristic in connection with a name of the field and/or a relative location of the field within the form submission.

In some examples, storing module 106 may store the characteristic by storing an aggregate representation of the textual field across multiple form submissions that accounts for the characteristic as observed in the form submission. In some examples, storing module 106 may not store the full value of the textual field (e.g., the raw text within the textual field). Additionally or alternative, storing module 106 may store a hash of the textual field to uniquely identify the value of the textual field in the form submission.

Using FIG. 4 as an example, HTTP proxy 420 may submit form content 422 from HTTP form submission 412 to form content analyzer 440 which may identify one or more form field characteristics 442 of one or more textual fields within form content 422. Storage module 106 may then, as a part of HTTP proxy 420, store form field characteristics 442 in database 450 (e.g., along with information identifying the form and/or the textual fields).

Returning to FIG. 3, at step 306 one or more of the systems described herein may determine, based at least in part on the characteristic of the value of the textual field, that the textual field includes user-generated content. For example, at step 306 determination module 108 may, as part of computing device 202 in FIG. 2, determine, based at least in part on the characteristic of the value of textual field 212, that textual field 212 includes user-generated content.

As used herein, the phrase "user-generated content" may refer to any textual content entered into a field by a user (e.g., as opposed to content that pre-populated the field). For example, the phrase "user-generated content" may refer to textual content typed into a field and/or pasted into a field. In some examples, determination module 108 may determine that the textual field includes user-generated content by determining that the textual field does not include content characteristic of a hidden field.

Determination module 108 may determine that the textual field includes user-generated content in any of a variety of ways. In some examples, determination module 108 may determine that the textual field includes user-generated content based at least in part on a plurality of characteristics of a plurality of values of the textual field collected from a plurality of form submissions. For example, one or more of the systems described herein may aggregate and/or analyze the plurality of characteristics to generate a statistical feature of the plurality of characteristics. In this example, determination module 108 may determine that the textual field includes user-generated content based at least in part on the statistical feature of the plurality of characteristics. The statistical feature may include any of a variety of types of information about observations of the textual field across form submissions. For example, the statistical feature may include the number of distinct values within the plurality of values observed within the textual field. For example, determination module 108 may determine that a field always has the same value (e.g., "String") across 40 form submissions. Accordingly, determination module 108 may determine that the textual field has only one distinct observed value. In this example, determination module 108 may determine that the textual field does not include user-generated content (e.g., because a constant value may imply a hidden field with pre-populated data).

As another example, the statistical feature may include the variance in textual length of the plurality of values observed within the textual field across the plurality of form submissions. For example, determination module 108 may determine that the longest observed length is 190 characters and the shortest observed length is 2 characters. Determination module 108 may therefore note a variance of 188 characters and determine, based on the variance being sufficiently large, that the textual field likely includes user-generated content.

In some examples, determination module 108 may use one or more machine learning techniques (e.g., using training data with textual fields classified as user-generated or not) to determine that the textual field includes user-generated content.

Using FIG. 4 as an example, at step 306 determination module 108 may, as a part of HTTP proxy 420 and/or heuristic analyzer 460, receive form field statistics 452 from database 450 and determine which fields of HTTP form submission 412 represent fields that are likely to have user-generated content (e.g., resulting in field categorizations 462, categorizing the fields as user-generated or not).

Returning to FIG. 3, at step 308 one or more of the systems described herein may intercept a subsequent form submission derived from the form. For example, at step 308 interception module 110 may, as part of computing device 202 in FIG. 2, intercept a subsequent form submission 230 also derived from form 220.

Interception module 110 may intercept the subsequent form submission in any suitable context. For example, interception module 110 may intercept the subsequent form submission on a proxy system configured to perform data-loss-prevention for the client system (and, in some examples, additional client systems). In some examples, the proxy system may be configured to intercept network traffic from the client system. For example, the proxy system may be configured to intercept all network traffic from the client system, network traffic from the client system destined to an external network, network traffic from the client system leaving a protected network, network traffic from certain applications on the client system, etc. In some examples, the proxy system may operate independently from the client system (e.g., on a separate computing device).

Returning to FIG. 3, at step 310 one or more of the systems described herein may subject the textual field within the subsequent form submission to a data-loss-prevention analysis based at least in part on determining that the textual field includes user-generated content. For example, at step 310 subjection module 112 may, as part of computing device 202 in FIG. 2, subject textual field 212 within form submission 230 to a data-loss-prevention analysis based at least in part on determining that textual field 212 includes user-generated content.

As used herein, the phrase "data-loss-prevention analysis" may refer to any analysis and/or scan performed to identify sensitive information by applying one or more rules and/or heuristics to data (e.g., to determine the disposition of the data in various scenarios).

Subjection module 110 may subject the user-editable field to the data-loss-prevention analysis in any suitable manner. For example, analysis module 108 may determine, from the metadata, that the textual field includes user-generated data and then, based on the determination, forward the textual field (e.g., along with any relevant contextual information) to a data-loss-prevention engine. Additionally or alternatively, subjection module 110 may operate as a part of a data-loss-prevention engine and apply a data-loss-prevention policy to the textual field.

Using FIG. 4 as an example, at step 310 subjection module 110 may, as a part of HTTP proxy 420 and/or data loss prevention engine 470, subject one or more of fields 472 to a data-loss-prevention analysis based at least in part on field categorizations 462.

Returning to FIG. 4, at step 312 one or more of the systems described herein may perform a data-loss-prevention action based on the data-loss-prevention analysis. For example, at step 312 performing module 114 may, as part of computing device 202 in FIG. 2, perform a data-loss-prevention action (e.g., on form submission 230) based on the data-loss-prevention analysis.

Performing module 114 may perform any of a variety of data-loss-prevention actions based on the data-loss-prevention analysis. For example, performing module 114 may block the form submission from reaching a target server. Additionally or alternatively, performing module 114 may redact the textual field from the form submission. For example, performing module 114 may remove sensitive portions of the textual field and/or remove the textual field entirely from the form submission. In some examples, performing module 114 may send a report of a data-loss-prevention policy violation to an administrator. Additionally or alternatively, performing module 114 may send a warning to a user that submitted the form (e.g., responding to the form submission with a web page containing a warning that the user may have violated a data-loss-prevention policy and/or that the form submission was blocked and/or modified). In additional examples, performing module 114 may block the client system from further communications with a target server of the submission form, disable the client system and/or a portion of the client system (e.g., a web browser on the client system), block outgoing network connections from the client system, and/or increase the sensitivity, severity, and/or thoroughness of data-loss-prevention scans for data associated with a responsible user and/or for form submissions from the responsible user.

In some examples, the data-loss-prevention analysis may determine that the textual field is in compliance with all data-loss-prevention policies. In these examples, performing module 114 may perform a data-loss-prevention action by allowing the form submission to proceed.

Using FIG. 4 as an example, at step 312 performing module 114 may, as a part of HTTP proxy 420 and/or data loss prevention engine 470, perform a data-loss-prevention action on HTTP form submission 412 (e.g., by blocking HTTP form submission 412 from reaching web server 430, by allowing HTTP form submission 412 to reach web server 430, by redacting HTTP form submission 412, etc.).

In some examples, one or more of the systems described herein may also (1) store an additional characteristic of an additional value of an additional textual field within the form submission on connection with the identifier of the form, (2) determine, based at least in part on the additional characteristic, that the additional textual field does not comprise user-generated content and (3) omit the additional textual field from the data-loss-prevention analysis based at least in part on determining that the additional textual field does not include user-generated content. For example, these systems may skip scanning textual fields that do not likely include user-generated content in order to save computing resources and/or to avoid false positives.

As explained above in connection with method 300 in FIG. 3, one or more of the systems described herein may identify form submissions from one or more clients, gather information on one or more textual fields in these form submissions, and use the gathered information to determine whether each textual field likely is used for transmitting user-generated data or not. Upon intercepting a form submission subject to data loss prevention, these systems may perform data loss prevention scans on those textual fields likely to contain user-generated data (and, thus, be at risk for data loss) while omitting any scan of those textual fields not likely to contain user-generated data.

Figure 5:
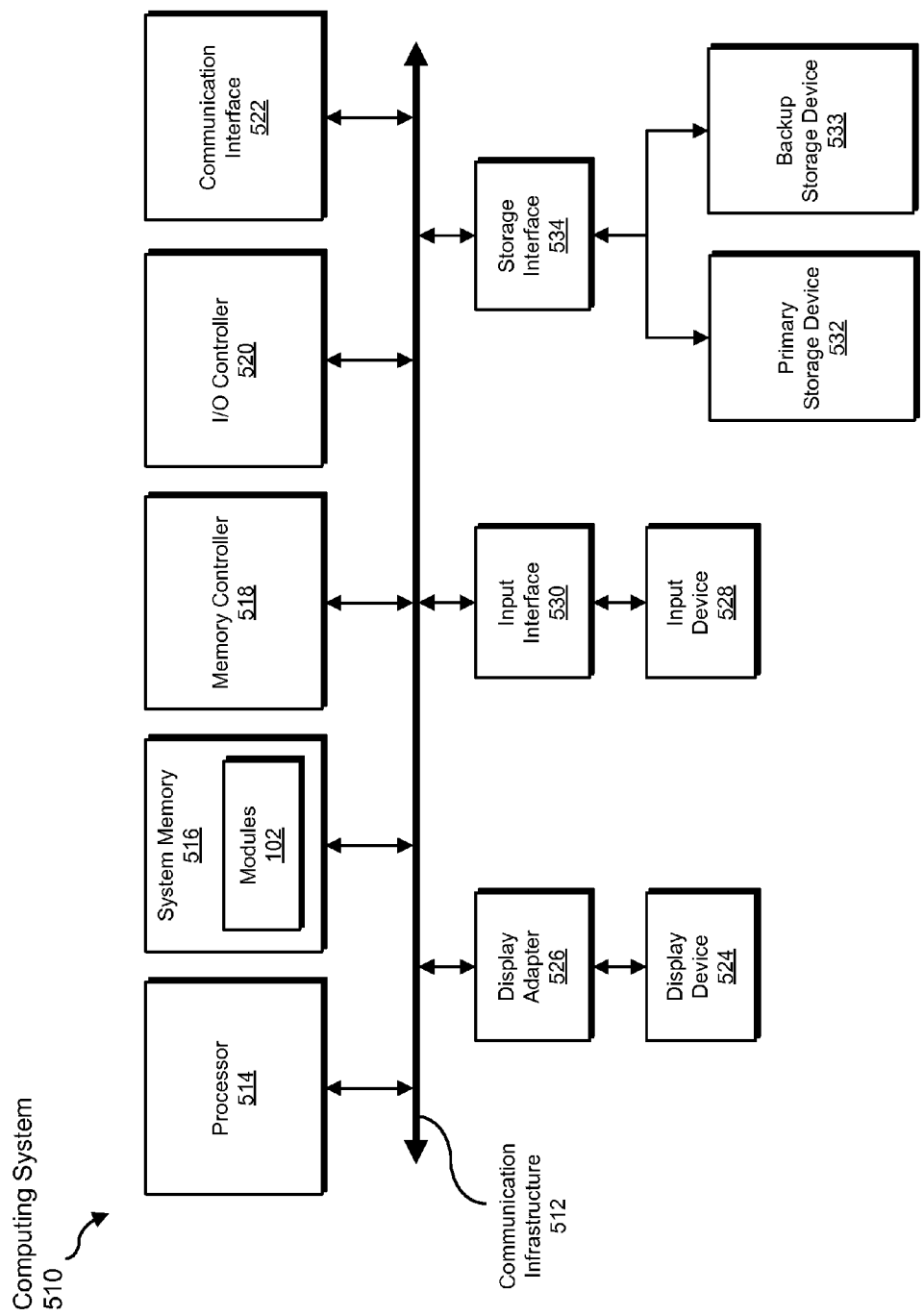
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the identifying, storing, determining, intercepting, subjecting, performing, blocking, redacting, and omitting steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
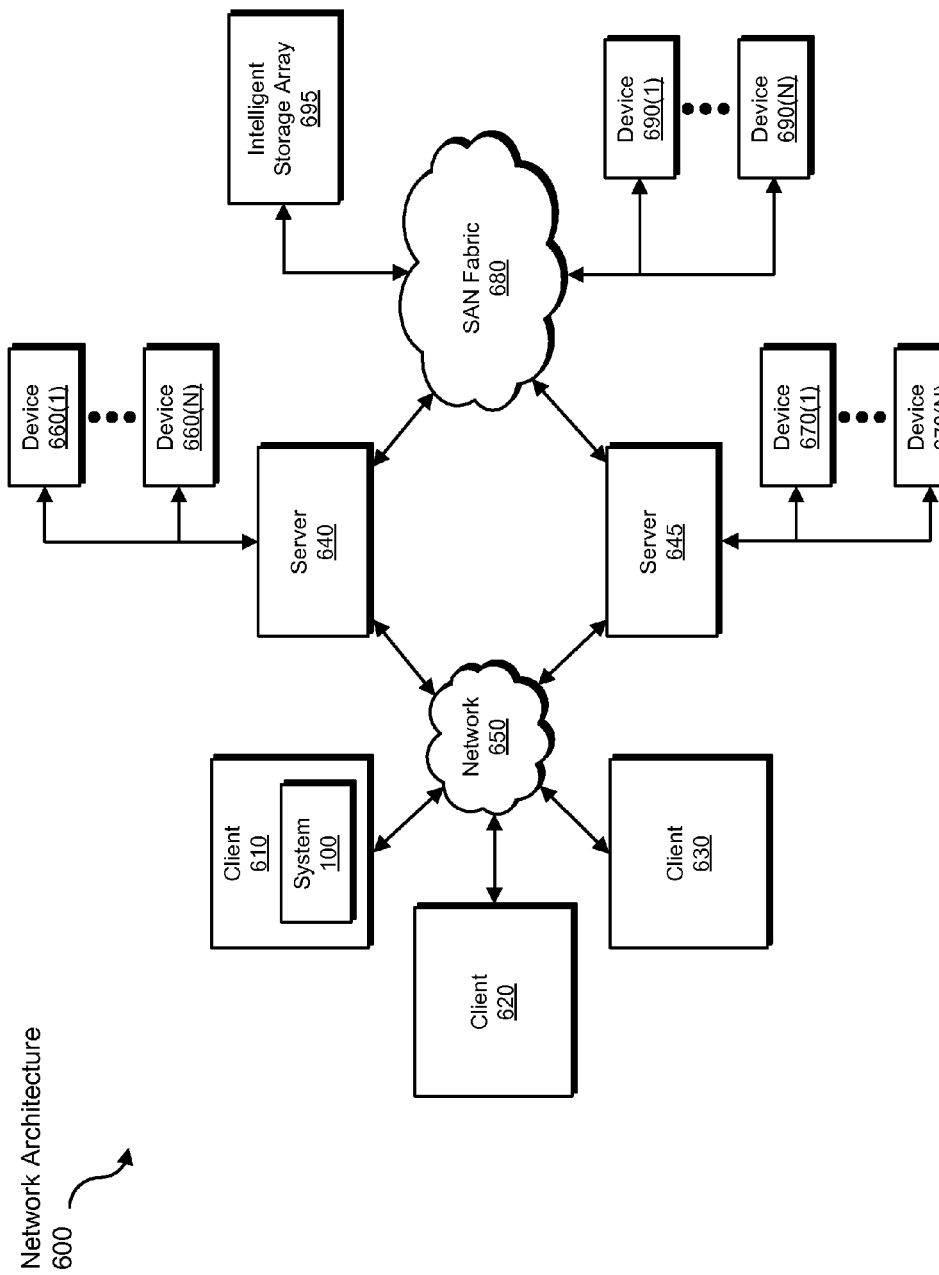
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, storing, determining, intercepting, subjecting, performing, blocking, redacting, and omitting steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for data loss prevention for text fields.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers)

to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive textual fields to be transformed, transform the textual fields, output a result of the transformation to a database, use the result of the transformation to determine whether future instances of the textual field are subject to data loss prevention scans, and store the result of the transformation to a storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for data loss prevention for text fields, at least a portion of the method being performed by a computing device comprising at least one processor, the method comprising:
    identifying, by the computing device, a form submission sent from a client system, the form submission comprising a textual field;
    storing, by the computing device, at least one characteristic of a value of the textual field within the form submission in connection with an identifier of a form used to generate the form submission;
    determining, by the computing device and based at least in part on the characteristic of the value of the textual field, that the textual field comprises user-generated content;
    storing, by the computing device an additional characteristic of an additional value of an additional textual field within the form submission in connection with the identifier of the form;
    determining, by the computing device and based at least in part on the additional characteristic, that the additional textual field does not comprise user-generated content;
    intercepting, by the computing device and a subsequent form submission derived from the form;
    subjecting, by the computing device, the textual field within the subsequent form submission to a data-loss-prevention analysis based at least in part on determining that the textual field comprises user-generated content;
    omitting, by the computing device, the additional textual field from the data-loss-prevention analysis based at least in part on determining that the additional textual field does not comprise user-generated content;
    performing, by the computing device, a data-loss-prevention action based on the data-loss-prevention analysis.

2. The computer-implemented method of claim 1, wherein determining that the textual field comprises user-generated content is based at least in part on a plurality of characteristics of a plurality of values of the textual field collected from a plurality of form submissions.

3. The computer-implemented method of claim 2, wherein determining that the textual field comprises user-generated content is based at least in part on a statistical feature of the plurality of characteristics.

4. The computer-implemented method of claim 3, wherein the statistical feature comprises at least one of:
    a number of distinct values within the plurality of values observed within the textual field;
    a variance in textual length of the plurality of values observed within the textual field.

5. The computer-implemented method of claim 1, wherein the characteristic comprises at least one of:
   a character distribution within the value of the textual field;
   a textual length of the value of the textual field;
   a number of spaces within the value of the textual field.

6. The computer-implemented method of claim 1, wherein intercepting the subsequent form submission comprises intercepting the subsequent form submission on an intermediate network device between a source of the subsequent form submission and a target of the subsequent form submission.

7. The computer-implemented method of claim 1, wherein storing the characteristic comprises storing the characteristic in connection with an identifier of the textual field.

8. The computer-implemented method of claim 1, wherein the data-loss-prevention action comprises at least one of:
   blocking the form submission;
   redacting the textual field from the form submission.

9. A system for data loss prevention for text fields, wherein:
   an identification module, stored in memory, that identifies a form submission sent from a client system, the form submission comprising a textual field;
   a storing module, stored in memory, that:
      stores at least one characteristic of a value of the textual field within the form submission in connection with an identifier of a form used to generate the form submission;
      stores an additional characteristic of an additional value of an additional textual field within the form submission in connection with the identifier of the form;
   a determination module, stored in memory, that:
      determines, based at least in part on the characteristic of the value of the textual field, that the textual field comprises user-generated content;
      determines, based at least in part on the additional characteristic, that the additional textual field does not comprise user-generated content;
   an interception module, stored in memory, that intercepts a subsequent form submission derived from the form;
   a subjection module, stored in memory, that:
      subjects the textual field within the subsequent form submission to a data-loss-prevention analysis based at least in part on determining that the textual field comprises user-generated content;
      omits the additional textual field from the data-loss-prevention analysis based at least in part on determining that the additional textual field does not comprise user-generated content;
   a performing module, stored in memory, that performs a data-loss-prevention action based on the data-loss-prevention analysis;
   at least one processor that executes the identification module, the storing module, the determination module, the interception module, the subjection module, and the performing module.

10. The system of claim 9, wherein the determination module determines that the textual field comprises user-generated content based at least in part on a plurality of characteristics of a plurality of values of the textual field collected from a plurality of form submissions.

11. The system of claim 10, wherein the determination module determines that the textual field comprises user-generated content based at least in part on a statistical feature of the plurality of characteristics.

12. The system of claim 11, wherein the statistical feature comprises at least one of:
   a number of distinct values within the plurality of values observed within the textual field;
   a variance in textual length of the plurality of values observed within the textual field.

13. The system of claim 9, wherein the characteristic comprises at least one of:
   a character distribution within the value of the textual field;
   a textual length of the value of the textual field;
   a number of spaces within the value of the textual field.

14. The system of claim 9, wherein the interception module intercepts the subsequent form submission by intercepting the subsequent form submission on an intermediate network device between a source of the subsequent form submission and a target of the subsequent form submission.

15. The system of claim 9, wherein the storing module stores the characteristic by storing the characteristic in connection with an identifier of the textual field.

16. The system of claim 9, wherein the data-loss-prevention action comprises at least one of:
   blocking the form submission;
   redacting the textual field from the form submission.

17. A non-transitory computer-readable-storage medium comprising one or more computer-readable instructions that, when executed by at least one processor of a computing device, cause the computing device to:
   identify a form submission sent from a client system, the form submission comprising a textual field;
   store at least one characteristic of a value of the textual field within the form submission in connection with an identifier of a form used to generate the form submission;
   determine, based at least in part on the characteristic of the value of the textual field, that the textual field comprises user-generated content;
   store an additional characteristic of an additional value of an additional textual field within the form submission in connection with the identifier of the form;
   determine, based at least in part on the additional characteristic, that the additional textual field does not comprise user-generated content;
   intercept a subsequent form submission derived from the form;
   subject the textual field within the subsequent form submission to a data-loss-prevention analysis based at least in part on determining that the textual field comprises user-generated content;
   omit the additional textual field from the data-loss-prevention analysis based at least in part on determining that the additional textual field does not comprise user-generated content;
   perform a data-loss-prevention action based on the data-loss-prevention analysis.

* * * * *

UNITED STATES PATENT AND TRADEMARK OFFICE
CERTIFICATE OF CORRECTION

| | | |
|---|---|---|
| PATENT NO. | : 8,887,291 B1 | Page 1 of 1 |
| APPLICATION NO. | : 13/782136 | |
| DATED | : November 11, 2014 | |
| INVENTOR(S) | : John Mears et al. | |

It is certified that error appears in the above-identified patent and that said Letters Patent is hereby corrected as shown below:

In the Claims

Claim 1, at column 16, lines 34 to 37, should read:
storing, by the computing device, an additional characteristic of an additional value of an additional textual field within the form submission in connection with the identifier of the form;

Claim 1, at column 16, lines 41 to 42, should read:
intercepting, by the computing device, a subsequent form submission derived from the form;

Claim 9, at column 17, line 18, should read:
A system for data loss prevention for text fields, the system comprising:

Signed and Sealed this
Fifth Day of May, 2015

Michelle K. Lee
*Director of the United States Patent and Trademark Office*